United States Patent [19]

Weber

[11] Patent Number: 4,554,163

[45] Date of Patent: Nov. 19, 1985

[54] METHOD OF CONTINUOUS EXTRACTION OF PARTICULATE SOLID MATERIAL

[75] Inventor: Klaus Weber, Hamburg, Fed. Rep. of Germany

[73] Assignee: Extraktionstechnik Gesellschaft Für Anlagenbau mbH, Hamburg, Fed. Rep. of Germany

[21] Appl. No.: 520,443

[22] Filed: Aug. 2, 1983

[30] Foreign Application Priority Data

Aug. 3, 1982 [DE] Fed. Rep. of Germany ....... 3228927

[51] Int. Cl.[4] ............................................. A61K 35/78
[52] U.S. Cl. .................................. 424/195.1; 426/655
[58] Field of Search .................. 260/236.5; 424/195.1; 426/655

[56] References Cited

FOREIGN PATENT DOCUMENTS

| | | |
|---|---|---|
| 1493190 | 9/1969 | Fed. Rep. of Germany ... 260/236.5 |
| 2638383 | 3/1977 | Fed. Rep. of Germany ... 260/236.5 |
| 2648048 | 4/1978 | Fed. Rep. of Germany ... 260/236.5 |
| 2709033 | 9/1978 | Fed. Rep. of Germany ... 260/236.5 |
| 2827002 | 1/1980 | Fed. Rep. of Germany ... 260/236.5 |
| 3016917 | 11/1981 | Fed. Rep. of Germany ... 260/236.6 |

*Primary Examiner*—Frederick E. Waddell
*Assistant Examiner*—John W. Rollins, Jr.
*Attorney, Agent, or Firm*—Michael J. Striker

[57] ABSTRACT

Continuous extraction of particulate solid material, particularly vegetable or animal raw material, with a highly compressed gas as a solvent includes forming a suspension by mixing a solid material with a liquefied gas in a suspension container under pressure which is lower than an extraction pressure, compressing the suspension to an extraction pressure greater than 10 bar and bringing to an extraction temperature, supplying the suspension into an extraction container which is supplied with fresh solvent in a counterstream to the solid material and from which an extract rich solution is withdrawn and thereafter the extracted solid material suspended in the liquefied gas is withdrawn from the extraction container, and continuously separating the withdrawn extract-poor solid material from the gas and discharging the same.

6 Claims, 2 Drawing Figures

METHOD OF CONTINUOUS EXTRACTION OF PARTICULATE SOLID MATERIAL

BACKGROUND OF THE INVENTION

The present invention relates to a method of continuous extraction of particulate solid materials, particularly vegetable or animal raw materials.

Methods of the above mentioned general type are known in the art. In known methods for recovery of extracts from vegetable or animal raw materials, solvent extraction is especially highly profitable. Conventionally, hexane or heptane are used as the solvent. This method possesses, however, the disadvantage of high apparatus and energy expenses which are used for recovering the solvent from the extract and the extract-poor solid material residues. Moreover, the conventional solvent is explosive. It has been known for a long time that these disadvantages can be avoided with the utilization of highly compressed gases as solvents. Certain gases in condition in the region of their critical points are transformed to solvents and their receptability for extracts is many times higher than can be expected from the respective vapor pressure values. These gases include health-acceptable non-explosive gases such as carbon dioxide and sulfur hexafluoride. Also, ethylene, propane, butane and isobutane are proposed as solvents. In addition to the health-acceptability and non-explosiveness, these solvents have the further advantage that in normal conditions they are gaseous and after extraction can be separated in a very simple and basic manner from the extract and the extract-poor solid material residues by vaporization. These processes are described in the German Pat. No. 1,493,190.

Continuous extraction of solid material with highly compressed gases is possible only when a container under high pressure is continuously charged with the solid material. In the absence of such charging devices, which must overcome pressure differences greater than 50 bar, the high pressure extraction of solid materials has been carried out only by separate charges. The expensive apparatus and personnel costs which result from the discontinuous operation are of great disadvantage for the high pressure extraction as compared with the extraction in condition of normal pressure.

The DE-AS 2,827,002 describes the possibility of a continuous extraction with utilization of high pressure sluices. Various experiments described in this reference are carried out, also by charges, with no hint of the technical realization of the above mentioned sluices given in this reference.

A continuous fluid device for fine-grain to dust-like solid materials in a reaction chamber under high pressure is known from the coal gasification and described in the DE-OS 2,648,048. A pressure differential of approximately 40 bar is overlapped here by condensing a mixture of coal and carbonic acid snow, separating the carbon dioxide by sublimation, and supplying the solid material into the reaction chamber. In this process the carbon dioxide is used as auxiliary means for continuous supplying of a solid material into a pressure container, in solid form as carbonic acid snow. Moreover, this reference does not provide any information about discharge of a residue from the reaction chamber.

The continuous extraction of caffeine from coffee with the highly compressed dioxide is disclosed in the DE-OS 2,638,383. In the process described there, a water solution is produced first from which the caffeine is then extracted. Here also a liquid-liquid extraction takes place.

The DE-OS 3,016,917 describes a semi-continuous method. The solvent continuously flows in circulation with the solid material in several pressure containers connected in series with one another, and the container is charged and emptied in charged manner.

SUMMARY OF THE INVENTION

Accordingly, it is an object of the present invention to provide a method of continuous extraction of particulate solid material, particularly vegetable or animal raw material, with a highly compressed gas as a solvent.

It is also an object of the present invention to provide a method of continuous extraction of particulate solid material, particularly vegetable or animal raw material, with a highly compressed gas as a solvent, in which the required continuous charging of the extraction container with the solid material is performed with conventional apparatuses which are reliable and tested.

In keeping with these objects and with others which will become apparent hereinafter, one feature of the present invention resides, briefly stated, in a method of continuous extraction of particulate solid material which includes forming a suspension by mixing solid material with a liquefied gas in a suspension container under pressure which is lower than an extraction pressure, compressing the suspension to an extraction pressure greater than 10 bar and bringing to an extraction temperature, supplying the suspension into an extraction container in which fresh solvent is supplied in a counterstream to the solid material and from which an extraction solution is withdrawn and thereafter the extracted solid material suspended in the liquefied gas is withdrawn from the extraction container, and continuously separating the withdrawn extract-poor solid material from the gas and discharging the same.

When the method is performed in accordance with the present invention, a suspension of liquefied gas and the solid material is first produced in the suspension container in step a. This takes place under pressure, which is selected so low that for charging the suspension container with the solid material conventional devices such as conveyor screws, cellular wheel sluices and the like can be utilized. At the present time a pressure below 10 bar is required. The subsequent continuous compression of the suspension to the desired high extraction pressure in step b can be carried out with the sludge pumps which are on the market, such as for example piston diaphragm pumps to approximately 500 bar.

The inventive method provides for the above described advantages of an extraction with highly compressed gas with simultaneous elimination of the disadvantages of the discontinuous conducting of the method forced by the high pressure.

A further advantage of the invention is that, for producing the suspension, the same gas is used which serves as solvent for the extract. Thereby there are no problems during mixing of the suspension with the solvent in the extraction container, and it is possible to simply replace the solvent losses in the suspension container.

In accordance with an advantageous embodiment of the method, the same device is used for discharge of the extract-poor solid material from an expansion container, which is used for charging the suspension container. It is possible, since the return of the vaporized gas for further utilization from the expansion container into the suspension container, the pressure acting in both containers is substantially equalized.

In accordance with another feature of the present invention, the separation of the withdrawn extract-poor solid material from the gas is carried out by stepped expansion in several further containers which are connected with one another in series, so that the still liquid gas in the last further container is brought into contact with the vaporized gas from a preceding further container and then both gas streams are brought to the same pressure, united, and supplied back to the expansion container. This considerably reduces the energy consumption of the cooling aggregate for liquefaction of the gas.

In accordance with still another feature of the present invention, the enriched solvent is vaporized for separation of the extract. This permits a simple and complete separation of the extract and solvent.

Still a further feature of the present invention is that the vaporous gas is withdrawn from the suspension container, liquefied by cooling, and supplied in liquid state back into the suspension container. With these features, the temperature in the suspension container can be simply regulated, and at the same time it is possible to blow non-condensable gas, for example air, prior to the return into the suspension container.

Still a further feature of the present invention is that the gas during the extraction is in overcritical condition. The solvent in the overcritical condition has an especially high receptability for the extract which is used here.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
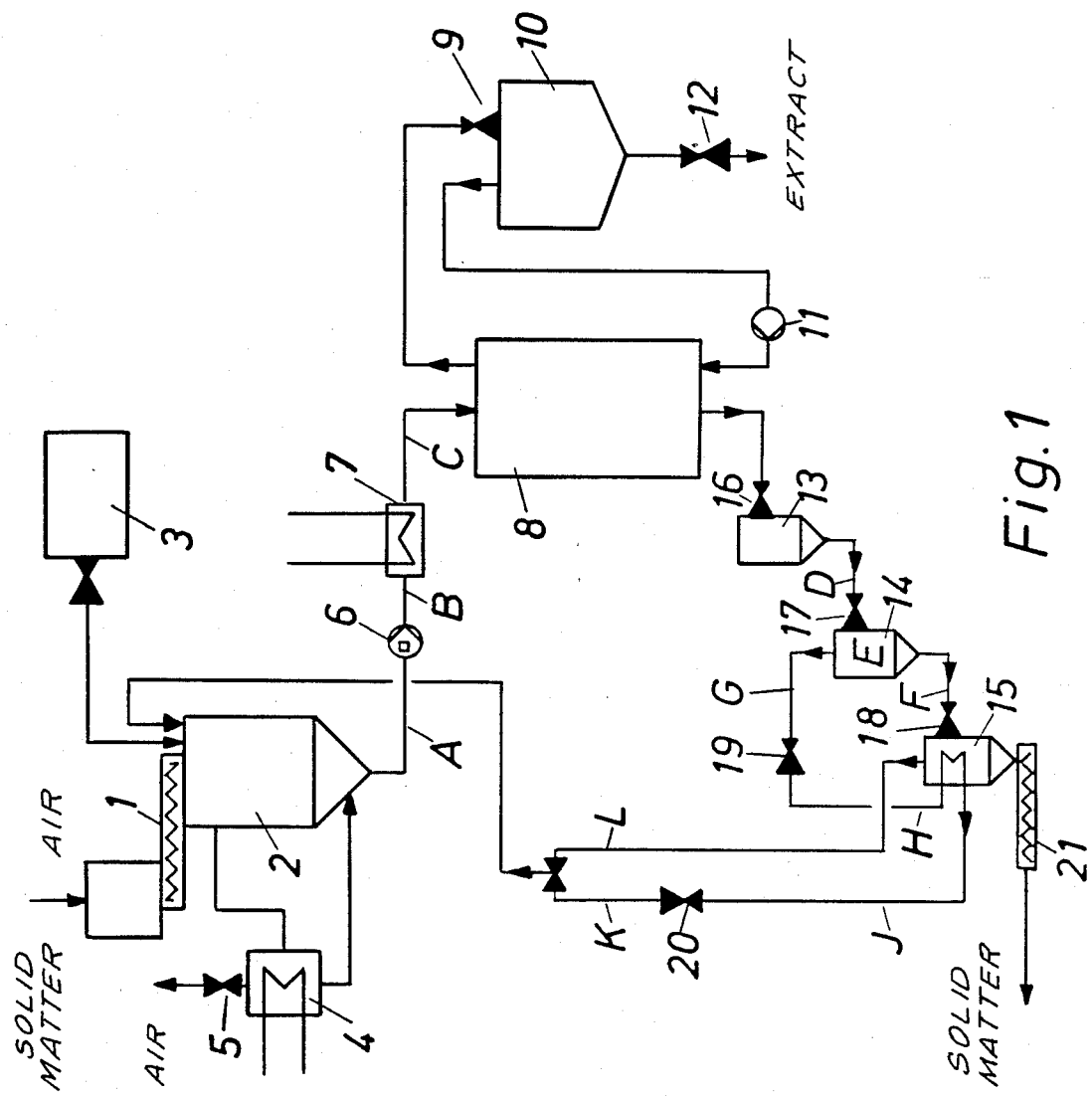
FIG. 1 is a schematical view showing an arrangement for continuous extraction of particulate solid material in accordance with the present invention.

A solid matter is continuously supplied by a charging device 1, for example a conveyor screw, into a suspension container 2. It is mixed there with carbon dioxide which is partially returned into the cycle, as will be described hereinbelow, and partially supplied for replenishing the loss from a container 3 filled with highly compressed carbon dioxide. Gaseous carbon dioxide which is vaporized by the contact with the solid matter or returned already in a gaseous state from the cycle is supplied from the upper part of the suspension container 2 into a heat exchanger 4 and liquefied in the latter. Simultaneously, a non-condensed gas, mainly air carried with the solid matter, is blown off through a valve 5. The liquid carbon dioxide is again returned to the suspension container 2.

Figure 2:
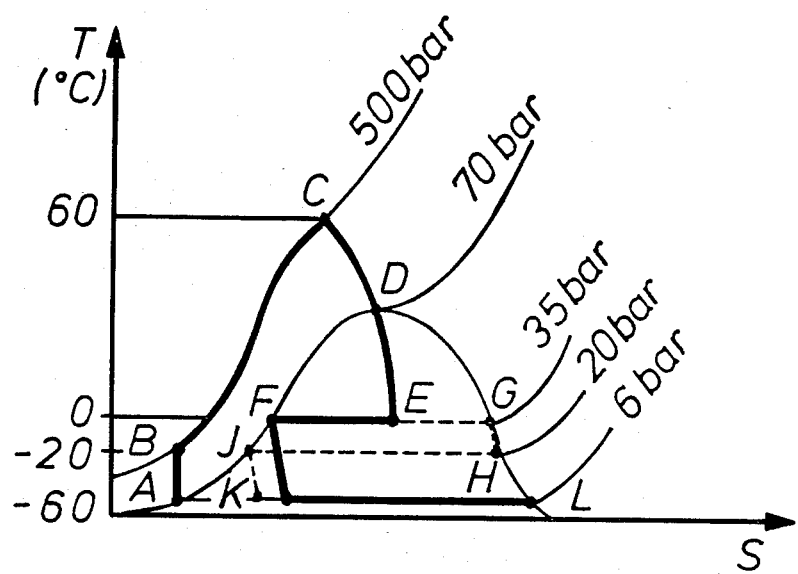
FIG. 2 is a view showing conditions of carbon dioxide during carrying out of the method in a T-S-diagram.

By regulating the temperature and the mass stream of a pump circulated carbon dioxide in the heat exchanger 4, the temperature in the suspension container 2 can be held at the desired level. The temperature and pressure are so adjusted there that a pumpable suspension of solid matter and liquid carbon dioxide is produced. The pressure for this is higher than the triple point of the carbon dioxide (5.14 bar). However it is so low that the charging device 1 of conventional apparatus, such as for example conveyor screws, cellular wheel sluices, etc. can be used. At the present time, a pressure below 10 bar is needed, in the shown example a pressure of approximately 6 bar is used. With this pressure a temperature of approximately $-50°$ C. is required to maintain the liquid carbon dioxide (condition A in FIG. 2). When the charging device 1 provides a pressure of 10 bar in the suspension container 2, a cooling of approximately $-40°$ C. is sufficient.

The suspension is continuously withdrawn from the suspension container 2 and then compressed with a pump 6, for example a piston diaphragm pump, to an extraction pressure (condition B FIG. 2), heated in a heat exchanger 7 to the extraction temperature (condition C), and supplied into an extraction container 8 from above. In the given example the extraction temperature and pressure (500 bar, $60°$ C.) is selected so that the carbon dioxide is in the overcritical condition. Such extraction conditions are selected for example in the extraction of oil seeds for obtaining a maximum absorption power of the solvent for the extract.

For avoiding damage to the extract, for example by thermal destruction, and an undesirably high apparatus expense, low extraction pressures and/or temperature are advantageous for the extraction of various solid materials, for example for hops 100 bar, $25°$ C. Also, on the energy reasons it may be favorable to carry out the extraction not in the overcritical region, for example for avoiding phase exchange of the solvent.

Fresh solvent, example carbon dioxide, is continuously supplied from below into the extraction container 8 in counterstream to the solid matter. Simultaneously, extract rich solution obtained by extraction is withdrawn above and suplied via a relief valve 9 to a separating container 10.

In the separating container 10 the solvent is separated by evaporation of the extract with the aid of pressure reduction or/and in some cases temperature increase. The gaseous solvent is liquefied by compression with the aid of the pump 11, and in some cases is additionally cooled, and then supplied in the cycle again in the container 8. The extract, in some cases after expansion through a valve 12, is continuously withdrawn from the separating container 10. The separation of the solvent from the extract is carried out in accordance with another modification of the process by adsorption or absorption, and it is also possible to carry out the separation by temperature increase and/or pressure decrease without vaporizing of the solvent.

The extract-poor solid matter flows in a suspension with a liquid carbon dioxide out of the container 8. The subsequent separation of the solid matter from the liquid gas takes place by expansion and vaporization of the gas in three expansion containers 13, 14, 15 connected one behind the other.

In the first container 13, the liquid gas is expanded through a valve 16 to a pressure which lies at the edge of the wet vapor region (70 bar, condition D). No vaporization of the liquid gas takes place here. During further pressure reduction in the container 14 through a valve 17 to approximately 35 bar, a part of the gas is vaporized (condition E). The solid matter flows subsequently with the still liquid gas (condition F) into the expansion container 15, in which a relief valve 18 provides the same pressure as in the suspension container 2 of approximately 6 bar. The residual liquid carbon dioxide in the container 15 is vaporized, since it receives via a heat exchanger the condensation heat of the already vaporized carbon dioxide from the container 14. For obtaining the temperature difference required for the heat transition, the carbon dioxide vapor from the container 14 (condition G) is expanded via a valve 19 less (approximately 20 bar, condition H) than is provided with the liquid carbon dioxide in the container 15. The condensed carbon dioxide (condition I) is brought subsequently by a pressure reducing valve 20 to a pressure which acts in the suspension container 2 of approximately 6 bar. It is again partially vaporized (condition K) and after this it is mixed with the vaporized carbon dioxide from the last container 15 (condition L) and returned to the suspension container 2. The complete vaporization of the residual liquid carbon dioxide in the container 15 can be obtained in some cases by a heat supply from outside.

The solid matter which is free of carbon dioxide and extract-poor is continuously moved from the container 15 by a discharge system 21. Since in the container 15 there is a pressure which corresponds to the pressure in the suspension container 2, the same devices can be used for charging the suspension container 2 with the solid matter and for discharging the solid matter from the container 15.

It will be understood that each of the elements described above, or two or more together, may also find a useful application in other types of constructions differing from the types described above.

While the invention has been illustrated and described as embodied in a method of continuous extraction of particulate solid materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of continuous extraction of particulate solid material, particularly vegetable raw material, with a highly compressed gas as a solvent selected from the group consisting of health-acceptable non-explosive gases, ethylene, propane, butane and isobutane, the method comprising the steps of forming a suspension by mixing a solid material with a liquified gas selected from the group consisting of health-acceptable non-explosive gases, ethylene, propane, butane and isobutane in a suspension container under pressure which is lower than an extraction pressure;

compressing the suspension to an extraction pressure greater than 10 bar and bringing to an extraction temperture;

supplying the suspension into an extraction container in which fresh solvent is supplied in a counter-stream to the solid material and from which an oil solution is withdrawn and thereafter the extracted solid material suspended in the liquified gas is withdrawn from the extraction container; and continuously separating from the gas the withdrawn extract-poor solid material and discharging the latter.

2. A method as defined in claim 1, wherein said separating step includes separating the withdrawn extract-poor solid material from the gas by stepped expansion in several further containers connected with one another in series, so that the still liquid gas in a last one of the further containers is brought in thermal contact with the vaporized gas from a preceding one of the further containers, and then both gas streams are brought to the same pressure, united and supplied back to the suspension container.

3. A method as defined in claim 1, wherein said separating step includes vaporizing of the enriched solvent for separation of the extract.

4. A method as defined in claim 1; and further comprising the steps of withdrawing from the suspension container the vaporous gas, liquefying the same by cooling, and supplying the same in liquid state back into the suspension container.

5. A method as defined in claim 1; and further comprising maintaining the gas during the extraction in overcritical condition.

6. A method as defined in claim 1, wherein said compressing step includes compressing the suspension at the extraction pressure greater than 50 bar.

* * * * *